Patented June 22, 1943

2,322,240

UNITED STATES PATENT OFFICE 2,322,240

PLASTICIZER

Edward L. Kropa, Stamford, Conn., assignor to American Cyanamid Company, New York, N. Y., a corporation of Maine No Drawing. Application October 5, 1939, Serial No. 298,053

9 Claims. (Cl. 260—33)

This invention relates to plasticizers for various resinous materials or other plasticizable solids.

An object of this invention is to provide plasticizers which have good chemical resistance. Another object of this invention is to provide plasticizers suitable for use with amino plastics including urea-formaldehyde resins, melamine-formaldehyde resins, etc.

These and other objects are attained by incorporating with a plasticizable solid a proportion of the reaction product of a polyamine with a hydroxy-carboxylic acid having at least eight carbon atoms.

The following examples in which the proportions are given as parts by weight are given by way of illustration and not in limitation.

Example 1

206 parts of diethylene triamine and 2699 parts of ricinoleic acid are mixed with 800 parts of toluene and the mixture heated slowly in a non-oxidizing atmosphere, distilling off water and toluene. When the temperature reaches 150° C., it is maintained at this point for thirty-five hours yielding a viscous resinous mass of acid number about 25 and an amine number (equivalent of mg. KOH/gram of resin) of about 16. The amine number is determined by means of a titration with acid in strong alcohol using benzene-azo-naphthylamine indicator.

Example 2

206 parts of diethylene triamine, 1788 parts of castor oil acids, and 400 grams of toluene are heated in the same manner as in Example 1 for twenty-six hours yielding a resin of acid number about 15 and an amine number of about 50.

Example 3

103 parts of diethylene triamine and 894 parts of castor oil acids are mixed and allowed to stand at room temperature until the exothermic reaction ceases. The reaction mixture is then subjected to reduced pressure, e. g., 10 mm. mercury absolute pressure, and is slowly heated to and maintained at 200° C. for about one half hour. The pressure is then reduced to about ½–1 mm. mercury (absolute) and the mass heated at the same temperature for seven and one half hours yielding a light yellow oily resinous mass having an acid number of about 20.

Example 4

103 parts of diethylene triamine, 556 parts of castor oil acids and 218 parts of acids derived from cocoanut oil by saponification are heated at about 180°–200° C. in a current of nitrogen at atmospheric pressure for about five hours yielding a light-colored viscous resin of acid number about 25.

Example 5

Freshly saponified castor oil acids (215 parts) possessing an acid number of about 164 are heated with 25 parts of diethylene triamine at 200° C. and at about 10 mm. absolute pressure for two hours and at about 1 mm. pressure for four to five hours to yield a gelatinous mass. This gelled product is soluble in ethanol and possesses an acid number of about 18.

Example 6

ω-Hydroxy-decanoic acid (46 parts) and 8.4 parts of diethylene triamine are heated at about 180°–200° C. for four hours at about 1 mm. pressure to yield a resinous product which is a light-colored solid.

Example 7

Castor oil acids (445 parts) were reacted with 37 parts of alpha-propylene diamine (1-methyl ethylene diamine-1,2) by heating at 200° C. under the following pressures: two hours at atmospheric pressure, one hour at about 10 mm. of mercury (absolute) and four hours at about 1 mm. yielding a resin of acid number of about 29 and an amine number of about 14–15.

Example 8

| | Parts |
|---|---|
| Diethylene triamine ricinoleate | 1 |
| Butylated urea-formaldehyde lacquer "A" | 2 |

Lacquer "A" contains 50% solids, 20% xylene and 30% butanol. The ricinoleate and the lacquer are blended and cut with the toluene to give the proper consistency for brushing. The composition is brushed on to tin and baked at about 150° C. for thirty minutes, thereby forming a clear, smooth, flexible and hard film.

Hard flexible films which are somewhat more mar-proof than those obtained with this composition may be produced by using 4 parts of lacquer "A" instead of 2 parts of lacquer "A" as in the above formulation. Further increase in the butylated urea-formaldehyde lacquer content results in some loss of flexibility.

Similar, clear, transparent, hard films are obtained with butylated melamine-formaldehyde lacquers and butylated mixed urea-melamine-formaldehyde lacquers.

*Example 9*

The resin from Example 1 is mixed with paraformaldehyde (10 parts of paraformaldehyde for every 100 parts of resin), heated to 125° C. and maintained at this temperature for ten minutes. The amine number is thus decreased from about 16 to about 8.

*Example 10*

The resin from Example 2 is similarly treated (25 parts paraformaldehyde to 500 parts of resin) decreasing the amine number from about 50 to about 24.

Both of the above resins blend satisfactorily with butylated urea-formaldehyde resin and yield faster drying films than those containing plasticizer prepared without formaldehyde treatment.

*Example 11*

400 parts of propylene diamine ricinoleate are reacted with about 4.5 parts of paraformaldehyde by heating to 120° C. The amine number decreases from about 15 to about 11.

*Example 12*

Dehydrated castor oil acids (500 parts) are reacted with 62 parts of diethylene triamine and heated as follows:

| Time, hours | Temperature, °C. | Absolute pressure, mm. Hg |
|---|---|---|
| 2 | 200 | 10 |
| 3 | 210 | 1 |
| 1.5 | 250 | 1 |
| 9.0 | 250 | 760 |

The final product has an amine number of about 20 and an acid number of about 20. Treatment with 20 parts of paraformaldehyde lowers the amine number to about 10.

Films prepared from the aldehyde-treated resin dissolved in xylene containing 0.05% cobalt dry rapidly on baking.

2 parts of butylated urea-formaldehyde lacquer "A" are mixed with 1 part of the aldehyde-treated resin. On flashing off the solvent, the film is opaque. On baking, a wrinkled, clear film results.

*Example 13*

The formaldehyde treated amino derivative when used as a plasticizer may also serve to emulsify an amino-aldehyde resinous composition.

Blends which contain 2 parts of butylated urea-formaldehyde lacquer "A" and 1 part of my plasticizer composition are homogenized with an equal weight of water and the solutions are allowed to stand. The following results are obtained:

A composition containing 2 parts of butylated urea-formaldehyde lacquer "A" and 1 part of diethylene triamine ricinoleate (Example 1) is homogenized with an equal weight of water. The resulting emulsion breaks in forty to forty-five days. If diethylene triamine ricinoleate be treated with formaldehyde and the resulting product mixed with lacquer "A" and homogenized in the same way as the untreated diethylene triamine ricinoleate, the composition is stable after forty to forty-five days.

*Example 14*

57 parts of β-hydroxyethyl-ethylene diamine and 325 parts of castor oil acids are heated at about 200° C. in vacuo at about 1–10 mm. of mercury absolute pressure for about eight hours, yielding a resin of acid number about 1. The resin is readily soluble in alcohol and toluene. It plasticizes butylated urea-formaldehyde lacquers.

If all or part of the castor oil acids be substituted with an equivalent proportion of sebacic acid and the reaction carried out in a similar manner (but for a somewhat shorter time) a somewhat water- and ethanol-soluble resin is obtained. Such resins are compatible with urea-formaldehyde resins in ratios of 1:1, for example and exert plasticizing effect.

Various polyamines or mixtures thereof may replace all or a part of the polyamine used in the above examples. Examples of these are: ethylene diamine, hydroxy ethylene diamine, triethylene tetramine, butylene diamine, pentamethylene diamine, hexamethylene diamine, etc.

In some instances it may be desirable to incorporate a proportion of dibasic organic acid in the reaction mixture and in such cases it is preferable that hydroxy-amines be used in place of all or part of the polyamines inasmuch as colored materials are frequently produced by reaction of dibasic acids and polyamines.

Part or all of the ricinoleic acid and ω-hydroxy-decanoic acid may be replaced with other hydroxy-carboxylic acids such as the hydroxy-stearic acids, α-hydroxy-behenic acid, α-hydroxy-palmitic acid, ricinelaidic acid, hydroxy undecylic acids, blown or oxidized fatty acids containing hydroxyl groups, ω-hydroxy-pentadecanoic acid, etc. Furthermore part of the hydroxy-carboxylic acid may be replaced with non-hydroxylated fatty acids, e. g., cocoanut oil acids, oleic acid, stearic acid, linseed oil acids, abietic acid, etc. Obviously various mixtures of the acids may be used, particularly mixtures of ricinoleic acid and ω-hydroxy-decanoic acid. It is frequently convenient to utilize the mixture of acids obtained by saponification of the natural oils such as castor oil.

In some applications it may be desirable to use the glycerides or other esters of the hydroxy-carboxylic acids, e. g., castor oil (triricinolein), methyl ricinoleate, ethyl ricinoleate, esters of ricinoleic acid and the glycols such as ethylene glycol, etc.

In many instances it is desirable to treat the hydroxy-carboxylic acid-amine reaction product with an aldehyde. While formaldehyde and its polymers are particularly convenient, other aldehydes may also be used e. g. acetaldehyde, propionaldehyde, crotonaldehyde, benzaldehyde, acrolein and methacrolein.

If drying oil acids be used, it is preferable that the reaction products be treated with an aldehyde, e. g., formaldehyde or its polymers, particularly if the compositions are to be used in lacquers or other coating compositions where it is desirable that compositions have good drying characteristics. The aldehyde treatment apparently eliminates any free amine groups which may be present.

The hydroxy-carboxylic acid-amine reaction products and the derivatives obtained by treatment with an aldehyde are suitable for plasticizing a wide variety of compatible resinous materials or plasticizable solids including products obtainable by reacting an aldehyde with one or more of the following: urea, thiourea, cyanamide, dicyandiamide, the solid heat decomposition products of dicyandiamide, aminotriazine (e. g., melamine, 2,4,6 triethyl- and triphenyl-triamine-1,3,5 triazines, ammeline, ammelide, formoguanamine, etc.), phenol, aniline, phenylene diamine, etc. Other resinous materials which may be plasticized with compatible hydroxy-carboxylic acid-amino reaction products include the alkyd resins, styrene resins, vinyl resins, methacrylate resins, etc. Other plasticizable solids which may be modified with compatible hydroxy-carboxylic acid-amine reaction products are the cellulose derivatives e. g. nitrocellulose, ethyl cellulose, etc.

If desirable the plasticizable resin such as urea-formaldehyde resin may be formed in the presence of the hydroxy-carboxylic acid-amine condensation product, i. e., by reacting urea with formaldehyde in an alcohol in the presence of said condensation product.

My plasticizers are especially useful in certain applications where it is desirable to combine the properties of emulsifier and plasticizer in one substance. The aldehyde treated materials are particularly good emulsifiers and find use as such in textile finishing or textile treating applications, as well as in coating compositions for use in other fields.

My plasticizers may also be utilized for priming metal surfaces in the form of the phosphoric acid salts.

My plasticizers are suitable for use in molding compositions and aqueous resinous syrups, as well as in non-aqueous compositions such as lacquers. They are particularly valuable with alkylated urea-formaldehyde resins in lacquer compositions, in alkylated melamine-formaldehyde lacquers and in alkylated urea-melamine-formaldehyde lacquers.

Obviously many modifications in the processes and compositions described above may be made without departing from the spirit and scope of the invention as defined in the appended claims.

I claim:

1. A urea-formaldehyde resin plasticized with a compatible reaction product of a polyamine with a hydroxy-carboxylic acid having at least eight carbon atoms.

2. A melamine-formaldehyde resin plasticized with a compatible reaction product of a polyamine with a hydroxy-carboxylic acid having at least eight carbon atoms.

3. Alkylated urea-formaldehyde resin plasticized with a compatible reaction product of ricinoleic acid and diethylene triamine.

4. Alkylated melamine-formaldehyde resin plasticized with a compatible reaction product of ricinoleic acid and diethylene triamine.

5. Alkylated urea - melamine - formaldehyde resin plasticized with a compatible reaction product of ricinoleic acid and diethylene triamine.

6. An aminoplastic material obtained by reacting in aldehyde with at least one substance selected from the group consisting of: urea, thiourea, cyanamide, dicyandiamide, aminotriazines and aniline plasticized with a compatible reaction product of a polyamine with omega-hydroxy-decanoic acid.

7. An aminoplastic material obtained by reacting an aldehyde with at least one substance selected from the group consisting of: urea, thiourea, cyanamide, dicyandiamide, aminotriazines and aniline plasticized with a compatible plasticizer obtained by reacting a polyamine with a hydroxy carboxylic acid having at least eight carbon atoms.

8. An aminoplastic material obtained by reacting an aldehyde with at least one substance selected from the group consisting of: urea, thiourea, cyanamide, dicyandiamide, aminotriazines and aniline plasticized with a compatible plasticizer obtained by reacting a polyamine with a hydroxy carboxylic acid having at least eight carbon atoms, said plasticizer having been treated with formaldehyde.

9. A process of plasticizing an aminoplastic material obtained by reacting an aldehyde with at least one substance selected from the group consisting of: urea, thiourea, cyanamide, dicyandiamide, aminotriazines and aniline which comprises adding thereto a compatible reaction produce of a polyamine with a hydroxy-carboxylic acid containing at least eight carbon atoms.

EDWARD L. KROPA.